United States Patent
Sawa et al.

(10) Patent No.: US 11,975,765 B2
(45) Date of Patent: May 7, 2024

(54) EXTERIOR PANEL AND AUTOMOBILE INCLUDING THE SAME

(71) Applicant: NIPPON STEEL CORPORATION, Tokyo (JP)

(72) Inventors: Yasunori Sawa, Tokyo (JP); Mai Nagano, Tokyo (JP); Ryuichi Nishimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/013,149

(22) PCT Filed: Jun. 30, 2021

(86) PCT No.: PCT/JP2021/024771
§ 371 (c)(1),
(2) Date: Dec. 27, 2022

(87) PCT Pub. No.: WO2022/004795
PCT Pub. Date: Jan. 6, 2022

(65) Prior Publication Data
US 2023/0242190 A1     Aug. 3, 2023

(30) Foreign Application Priority Data
Jul. 3, 2020 (JP) .................. 2020-115280

(51) Int. Cl.
*B62D 29/00* (2006.01)
*C21D 9/46* (2006.01)
(Continued)

(52) U.S. Cl.
CPC ............. *B62D 29/007* (2013.01); *C21D 9/46* (2013.01); *C22C 38/02* (2013.01); *C22C 38/42* (2013.01);
(Continued)

(58) Field of Classification Search
None
See application file for complete search history.

(56) References Cited

U.S. PATENT DOCUMENTS 6,638,371 B1 * 10/2003 Mochida ................. C22C 38/08
148/320
10,961,600 B2 * 3/2021 Takashima ............. C22C 38/20

FOREIGN PATENT DOCUMENTS

JP      2016-156079 A     9/2016

* cited by examiner

*Primary Examiner* — Daniel J. Schleis
(74) *Attorney, Agent, or Firm* — Birch, Stewart, Kolasch & Birch, LLP (57) ABSTRACT

There is provided an exterior panel including a steel sheet, the steel sheet including a flat portion, wherein in an outer-layer region of the flat portion, a microstructure contains, in volume fraction, ferrite of 80% or more, an average grain diameter of ferrite is 1.0 to 15.0 μm, an intensity ratio $X_{ODF\{001\}/\{111\},S}$ of ferrite is 0.30 or more to less than 3.50, when $uEl_1$ denotes a uniform elongation measured with a tensile test specimen cut from the flat portion, and $uEl_2$ denotes a theoretical uniform elongation that is derived from volume fractions, hardnesses, and average grain diameters of ferrite and martensite in a microstructure of an inside region of the flat portion, and a sheet thickness of the flat portion, $uEl_1/uEl_2$ is 0.44 to 0.80.

8 Claims, 1 Drawing Sheet

(51) Int. Cl.
*C22C 38/02* (2006.01)
*C22C 38/42* (2006.01)
*C22C 38/44* (2006.01)
*C22C 38/48* (2006.01)
*C22C 38/50* (2006.01)
*C22C 38/54* (2006.01)

(52) U.S. Cl.
CPC .............. *C22C 38/44* (2013.01); *C22C 38/48* (2013.01); *C22C 38/50* (2013.01); *C22C 38/54* (2013.01)

EXTERIOR PANEL AND AUTOMOBILE INCLUDING THE SAME

TECHNICAL FIELD

The present invention relates to an exterior panel and an automobile including the exterior panel.

BACKGROUND ART

In recent years, there have been demands for increases in fuel efficiency of automobiles for the conservation of the global environment. In connection to increases in fuel efficiency of automobiles, steel sheets for automobiles are required to have higher strength in order to reduce weights of automobile bodies while ensuring safety. Such a requirement for high strengthening has been increased for not only members, pillars, and the like, which are structure members, but also exterior panels for automobiles (hood, fender panel, door panel, roof panel, etc.). To meet such a requirement, materials for both strength and elongation (formability) have been developed.

On the other hand, shaping of exterior panels of automobiles tends to be increasingly complicated. Strengthening of a steel sheet for weight reduction makes it difficult to work the steel sheet into a complex shape. In addition, when a thickness of a steel sheet is decreased for weight reduction, the steel sheet is prone to unevenness on its surface when the steel sheet is formed into a complex shape. Unevenness occurring on the surface degrades its appearance after formation. Exterior panels, for which not only properties such as strength but also designability is important, are required to be excellent in surface property after their formation.

Regarding a connection between a surface property after formation and material properties of a steel sheet to be applied to an exterior panel, for example, Patent Document 1 discloses a ferritic thin steel sheet in which an area fraction of crystals having crystal orientations within ±15° from {001} plane parallel to a surface of the steel sheet is set to 0.25 or less, and an average grain diameter of the crystals is set to 25 μm or less, for improving surface property after bulging.

LIST OF PRIOR ART DOCUMENTS

Patent Document

Patent Document 1: JP2016-156079A

SUMMARY OF INVENTION

Technical Problem

For exterior panels of automobiles, in addition to a good surface property after formation of a starting material, a good dent resistance is required. The dent resistance refers to how a dent resists remaining after a load is removed, when a local load is applied to a panel for some reason. In a case of a body of an actual automobile, a dent occurs when an outer panel such as that of a door is strongly pressed by a finger or a palm or when a flying stone hits during traveling. A dent occurs by plastic deformation at a location where a load is applied to a panel.

Therefore, when a strain of a panel in applying a load to the panel reaches a certain level, the strain remains even after the load is removed, and a dent occurs. A minimum value of a load that causes a certain residual strain in a panel is referred to as a dent load, and the larger dent load a panel has, the more excellent in dent resistance it is. Patent Document 1 has no disclosure about improvement in dent resistance.

In view of these circumstances, one of objectives of the present invention is to provide an exterior panel that is excellent in surface property after the exterior panel is formed from its starting material and that is excellent in dent resistance, and to provide an automobile including the exterior panel.

Solution to Problem

The present invention has a gist of an exterior panel and an automobile including the exterior panel described below.

(1) An exterior panel including a steel sheet, the steel sheet including a flat portion, wherein in an outer-layer region of the flat portion, a microstructure contains, in volume fraction, ferrite of 80% or more, an average grain diameter of ferrite is 1.0 to 15.0 μm, an intensity ratio $X_{ODF\{001\}/\{111\},S}$ between {001} orientation and {111} orientation of ferrite is 0.30 or more to less than 3.50, and when $uEl_1$ denotes a uniform elongation measured with a tensile test specimen cut from the flat portion, and $uEl_2$ denotes a theoretical uniform elongation that is derived by Formula (I) shown below from volume fractions, hardnesses, and average grain diameters of ferrite and martensite in a microstructure of an inside region of the flat portion, and a sheet thickness of the flat portion, $uEl_1/uEl_2$ is 0.44 to 0.80:

$$uEl_2 = -0.057 Hf \times Vf/100 - 0.055 Hm \times Vm/100 - 0.35 d^{-1/2} - 0.571h + 27.2 \quad (I)$$

where the meaning of each symbol in Formula (I) above is as follows:

Hf: Vickers hardness (HV 0.01) of ferrite in the inside region

Hm: Vickers hardness (HV 0.01) of martensite in the inside region

Vf: Volume fraction (%) of ferrite in the inside region

Vm: Volume fraction (%) of martensite in the inside region d: Average grain diameter (μm) in the inside region calculated from Formula (II) shown below $$d = (df \times Vf + dm \times Vm)/(Vf + Vm) \quad (II)$$

df: Average grain diameter (μm) of ferrite in the inside region dm: Average grain diameter (μm) of martensite in the inside region h: Sheet thickness (mm) of the flat portion.

(2) The exterior panel according to (1) above, wherein a sheet thickness of the flat portion is 0.20 to 0.60 mm.

(3) The exterior panel according to (1) or (2) above, wherein a tensile strength of the steel sheet is 300 to 650 MPa.

(4) An automobile comprising the exterior panel according to any one of (1) to (3).

Advantageous Effects of Invention

According to the present invention, an exterior panel that is excellent in surface property after the exterior panel is formed from its starting material and that is excellent in dent resistance.

DESCRIPTION OF EMBODIMENTS

Circumstances of conceiving the present invention will be first described below, and embodiments will be described next in detail.

For the weight reduction of automobile bodies, reduction in thickness of body members constituting an automobile body has been underway. The body members include exterior panels. The exterior panels are each a one-piece item. The exterior panels are exterior members of an automobile. Examples of the exterior panels can include an outer panel of a hood, a fender panel, a quarter panel, a door outer panel, and a roof panel.

Such an exterior panel is formed by cutting a cold-rolled steel sheet, and subjecting the cold-rolled steel sheet to press forming, coating, and baking finish (bake hardening treatment) after the coating. For such a steel sheet being a starting material of an impact absorbing member, a strain in the steel sheet is preferably as low as possible for a good surface property after formation. This is because, when the strain is low, the entire of the steel sheet is evenly deformed by the press forming, resulting in small variations in surface property. However, when a strain in a steel sheet is low, its dent resistance becomes poor because its yield stress after formation is low.

The present inventors conducted intensive studies and consequently obtained a finding that a surface property after formation can be made good by controlling a microstructure fraction, a texture, and grain diameters of an outer-layer region of a steel sheet. Further, the present inventors obtained a finding that the dent resistance is improved by making a strain in formation of a steel sheet higher than a typical value of a strain in formation of steel sheets. As a result of such studies, the present inventors conceive the present invention based on the findings, making it possible to provide an exterior panel that is excellent in surface property after the exterior panel is formed and that is additionally excellent in the dent resistance, and to provide an automobile including the exterior panel.

Embodiments of the present invention will be described below.

Exterior Panel

As an exterior panel used in the present embodiment, the exterior panel described above can be exemplified. The exterior panel is produced by the process described above. The exterior panel includes a steel sheet and a coating layer that is formed on the steel sheet. The steel sheet may include a plating layer on its surface, or no plating layer may be formed on the surface. Note that in a case where the steel sheet includes the plating layer, a "surface of the steel sheet" will be referred to as a surface of a base metal of the steel sheet, from which the plating layer is excluded. The exterior panel may be constituted only by the steel sheet without the coating layer.

The exterior panel includes three portions. Specifically, the exterior panel includes (i) an edge portion, (ii) an end portion, and (iii) a center-side portion as a portion of the exterior panel other than the edge portion and the end portion.

The edge portion of (i) is a portion folded by being subjected to hemming (HEM) or fixed to another component by welding such as spot welding. The end portion of (ii) is a portion positioned from the edge portion toward a middle side of the exterior panel and is a portion other than a portion subjected to the hemming or fixed to another component by welding or the like. The end portion is a location several millimeters away from the edge portion toward the center side of the exterior panel and is a location that is substantially not influenced by processing for fixing the exterior panel to another component. The phrase "substantially not influenced" in this case means that an amount of change in a property by the processing for fixing the exterior panel to the other component is within several percent.

The center-side portion of (iii) is seen from the outside of the automobile as an exterior of the automobile. Of the center-side portion of the exterior panel, a location having a curvature radius of 500 mm or more will be herein referred to as a flat portion. That is, the steel sheet according to the present embodiment includes a flat portion.

In the present invention, it is important to control a microstructure and properties in an outer-layer region and an inside region of the flat portion. Note that definitions of the outer-layer region and the inside region vary depending on a sheet thickness. Specifically, when t is defined to denote a sheet thickness of the flat portion and when t is 0.25 mm or less, the outer-layer region is defined as a region in the flat portion from a surface of the steel sheet to a t/4 depth position in a sheet-thickness direction (depth direction), and the inside region is defined as a region from the t/4 depth position to a t/2 depth position.

Further, when t is more than 0.25 mm to 0.40 or less, the outer-layer region is defined as a region in the flat portion from the surface of the steel sheet to a 50-μm depth position, and the inside region is defined as a region from the 50-μm depth position to the t/4 depth position. Further, when t is more than 0.40 mm, the outer-layer region is defined as a region in the flat portion from the surface of the steel sheet to the 50-μm depth position, and the inside region is defined as a region from the 50-μm depth position to a 100-μm depth position.

Outer-Layer Region

As a result of investigations conducted by the present inventors, it was found that surface unevenness occurs due in forming to an uneven deformation in the forming that is attributable to unevenness in strength in micro-regions. It was found that, particularly, a microstructure in the outer-layer region has a great influence on the occurrence of the unevenness on a surface. Accordingly, for the steel sheet according to the present embodiment, the microstructure in the outer-layer region is controlled as follows.

[Volume Fraction of Ferrite: 80% or More]

If a volume fraction of ferrite in the outer-layer region is less than 80%, a surface quality of the steel sheet tends to degrade after the formation. Therefore, the volume fraction of ferrite is set to 80% or more. The volume fraction is preferably 90% or more, 95% or more, or 98% or more. The whole of the microstructure in the outer-layer region may be ferrite, and thus an upper limit of the volume fraction may be set to 100%.

A remaining microstructure in the outer-layer region is, for example, any one or more of pearlite, bainite, martensite, and tempered martensite. When the volume fraction of ferrite in the outer-layer region is 100%, a volume fraction of the remaining microstructure is 0%. Note that, in the present invention, the martensite includes tempered martensite.

The volume fraction of ferrite in the outer-layer region is determined by the following method.

A sample (having a size that is roughly sheet thickness of steel sheet×20 mm in a width direction×20 mm in a direction perpendicular to the sheet-thickness direction and the width direction) for microstructure observation is extracted from a W/4 position or a 3W/4 position of a sheet width W of the steel sheet (i.e., W/4 position in the width direction from any one of end portions of the steel sheet in the width direction). Subsequently, a cross section of the sample parallel to the width direction and the sheet-thickness direction is polished as an observation surface and etched with LePera etchant, and then a microstructure on the observation surface is observed under an optical microscope. Then, an area fraction of ferrite in the outer-layer region is measured. Note that, in the present invention, the width direction of the steel sheet means a direction that corresponds to a front-back direction of an automobile when the exterior panel is attached to the automobile.

The observation under an optical microscope after LePera etching allows distinction between ferrite and other hard microstructures to be made because microstructures are observed with different colors such as black for bainite, white for martensite (including tempered martensite), and gray for ferrite.

More specifically, 10 fields on the observation surface are observed at a magnification of ×500, outer-layer regions in the resultant optical micrographs are specified, and the outer-layer regions are subjected to image analysis with image analysis software "Photoshop CS5" from Adobe Inc., to determine an area fraction of ferrite.

As an image analysis method, for example, a maximum brightness value $L_{max}$ and a minimum brightness value $L_{min}$ of an image are obtained from the image, portions each having pixels with a brightness of $L_{max}-0.3(L_{max}-L_{min})$ to $L_{max}$ are defined as white regions, portions having pixels with a brightness of $L_{min}$ to $L_{min}+0.3(L_{max}-L_{min})$ are defined as black regions, and the remaining portions are defined as gray regions, and an area fraction of the gray regions, which are ferrite, is calculated. The ten observation fields in total are subjected to the image analysis as described above to measure area fractions of ferrite, and the area fractions are averaged to calculate an average value. The average value is taken as a volume fraction of ferrite in the outer-layer region.

[Average Grain Diameter of Ferrite: 1.0 to 15.0 μm]

If an average grain diameter of ferrite is more than 15.0 μm, surface property after the formation deteriorates. The average grain diameter of ferrite in the outer-layer region is therefore set to 15.0 μm or less. The average grain diameter of ferrite is preferably set to 12.0 μm or less.

On the other hand, if the average grain diameter of ferrite is less than 1.0 μm, particles having {001} orientation of ferrite tend to agglomerate to be produced. Even when the particles having the {001} orientation of ferrite are individually small, if the particles agglomerate to be produced, deformation concentrates at a portion of the agglomeration, and surface property after the formation deteriorates. The average grain diameter of ferrite in the outer-layer region is therefore set to 1.0 μm or more. The average grain diameter of ferrite is preferably 3.0 μm or more, and more preferably 6.0 μm or more.

The average grain diameter of ferrite in the outer-layer region can be determined by the following method. In the optical micrographs described above, outer-layer regions are specified, and the outer-layer regions are subjected to image analysis in the above manner with the image analysis software "Photoshop CS5" from Adobe Inc., to measure an area fraction of ferrite and the number of ferrite particles. From an area of the analyzed regions and the area fraction of ferrite, a total area of ferrite is calculated, and further, the total area of ferrite is divided by the number of ferrite particles, by which an average area per ferrite particle is calculated. From the average area, an equivalent circle diameter is calculated, and the resultant equivalent circle diameter is taken as the average grain diameter of ferrite.

[Intensity Ratio $X_{ODF\{001\}/\{111\},S}$: 0.30 or More to Less Than 3.50]

In the outer-layer region, when an intensity ratio $X_{ODF\{001\}/\{111\},S}$ between {001} orientation and {111} orientation of ferrite is 0.30 or more to less than 3.50, the surface property after the formation of the steel sheet is improved. The reason for this is unclear but can be considered to be due to restraint on uneven deformation on a surface based on an interaction between an existence form and a crystal orientation distribution of ferrite.

If $X_{ODF\{001\}/\{111\},S}$ is less than 0.30, uneven deformation attributable to an orientation distribution and intensity differences of crystals in material tends to occur, and deformation concentration in an orientation in a vicinity to {001} of ferrite becomes prominent. On the other hand, If $X_{ODF\{001\}/\{111\},S}$ is 3.50 or more, uneven deformation attributable to the orientation distribution and the intensity differences of crystals in material tends to occur, and unevenness on a surface of the steel sheet tends to develop.

The intensity ratio $X_{ODF\{001\}/\{111\},S}$ between {001} orientation and {111} orientation of ferrite in the outer-layer region can be determined by the following method with the electron back scattering diffraction (EBSD) method.

A sample for texture measurement is extracted from the W/4 position or the 3W/4 position of the sheet width W of the steel sheet (i.e., W/4 position in the width direction from any one of end portions of the steel sheet in the width direction), the sample is then ground by mechanical grinding such that a cross section including the outer-layer region parallel to the width direction and the sheet-thickness direction serves as a measurement surface, a strain on the measurement surface is removed by chemical polishing or electrolytic grinding, and the sample is subjected to the texture measurement.

A crystal orientation distribution of the outer-layer region of the sample is measured by the EBSD method at pitches of 0.5 μm or less. Ferrite is extracted using an image quality (IQ) value map, which is analyzable with Electron Back Scatter Diffraction Pattern-Orientation Image Microscopy (EBSP-OIM, (R)). Since ferrite is characterized by having large IQ values, this method enables easy distinction from other microstructures. A threshold value of IQ values is set such that the area fraction of ferrite calculated by the microstructure observation after the LePera etching described above matches the area fraction of ferrite calculated based on the IQ values.

On a $\phi 2=45°$ cross section in a three-dimensional texture in a form of an orientation distribution functions (ODF) display calculated using crystal orientations of the extracted ferrite, the $X_{ODF\{001\}/\{111\},S}$, which is a ratio between a maximum value of random intensity ratios of {001} orientation group and a maximum value of random intensity ratios of {111} orientation group (γ-fiber), is obtained. A random intensity ratio is a ratio of an intensity of a measured material to an intensity of a random orientation material, which has no aggregation in a specific orientation, that is, a numeric value obtained by dividing the intensity of the measured material by the intensity of the random orientation material. For example, when the steel sheet is rolled at a high rolling reduction of 70% or more and annealed, a texture develops, and a random intensity ratio of {111} orientation group (γ-fiber) increases.

Here, {hkl} indicates that, when a sample is extracted by the method described above, a normal direction of a surface is parallel to <hkl>. Regarding an orientation of a crystal, an orientation perpendicular to a surface is usually displayed as (hkl) or {hkl}. {hkl} is a general index of equivalent planes, and (hkl) refers to an individual crystal face. In other words, in the present embodiment, a body-centered cubic structure (bcc structure) is mentioned, and therefore, for example, surfaces (111), (–111), (1-11), (11-1), (–1-11), (–11-1), (1-1-1), and (–1-1-1) are equivalent and are not distinguished from one another. In such a case, these orientations are collectively referred to as {111} orientation group. The ODF display is also used in an orientation display of other crystal structures having low symmetry, and thus, in the ODF display, individual orientations are usually given by (hkl)[uvw]; however, in the present embodiment, the present inventors found that a normal direction orientation of a surface has a great influence on the development of unevenness after the formation and focused on the normal direction orientation {hkl}.

Inside Region

[$uEl_1/uEl_2$: 0.44 to 0.80]

The value $uEl_1/uEl_2$ is an element that has an influence on the dent resistance and the surface property of the exterior panel. From a steel sheet that is excellent in surface property after formation because of small unevenness of its surface, the present inventors gained an idea and consequently came to focus on a relation between a uniform elongation $uEl_1$ of the steel sheet and a theoretical uniform elongation $uEl_2$ from the viewpoint of improving the dent resistance. It can be said that there has been no one who has focused on the theoretical uniform elongation $uEl_2$ from the viewpoint of the dent resistance.

When $uEl_1/uEl_2$ is within the range of 0.44 to 0.80, a moderately high prestrain is applied to the steel sheet, and a reduction in its sheet thickness results only in a minor effect of stress reduction. In addition, unevenness on the surface of the steel sheet can be decreased. If $uEl_1/uEl_2$ is more than 0.80, a sufficient prestrain is not applied, resulting in a low yield stress, which makes it difficult to ensure a sufficient dent resistance. On the other hand, if $uEl_1/uEl_2$ is less than 0.44, an amount of the prestrain in the steel sheet is more than 6%, and as a result, an advantageous effect of improving the yield stress is saturated, the effect of stress reduction by the reduction in the sheet thickness becomes prominent, which rather degrades the dent resistance. In addition, the unevenness on the surface of the steel sheet is increased, resulting in a deterioration in the surface property after the formation.

The uniform elongation $uEl_1$ can be determined through a tensile test performed in conformity to JIS Z 2241:2011 with a No. 5 test coupon specified in JIS that is cut such that its longitudinal direction matches a width direction of a flat portion of the steel sheet.

A calculation formula of the theoretical uniform elongation $uEl_2$ is disclosed in "Feraito-marutensaito-kou no soshiki to hipparitokusei (in Japanese)" (Microstructure and tensile properties of ferrite-martensitic steel), Report, Working group on prediction and control of deformation property, Tokki kenkyukai, The Iron and Steel Institute of Japan, (1994), p.305 written by Minoru Umemoto, Tsuyoshi Ushida, Hiroshi Kimura, and Takahiko Ogura. Referring to the calculation formula and experimental results, the theoretical uniform elongation $uEl_2$ is calculated from Formula (I) shown below.

$$uEl_2 = -0.057 Hf \times Vf/100 - 0.055 Hm \times Vm/100 - 0.35 d^{-1/2} - 0.571 h + 27.2 \quad (I)$$

Here, the meaning of each symbol in Formula (I) above is as follows.

Hf: Vickers hardness (HV 0.01) of ferrite in the inside region

Hm: Vickers hardness (HV 0.01) of martensite in the inside region

VE Volume fraction (%) of ferrite in the inside region

Vm: Volume fraction (%) of martensite in the inside region d: Average grain diameter (μm) in the inside region calculated from Formula (II) shown below $$d = (df \times Vf + dm \times Vm)/(Vf + Vm) \quad (II)$$

df: Average grain diameter (μm) of ferrite in the inside region dm: Average grain diameter (μm) of martensite in the inside region h: Sheet thickness (mm) of the flat portion Note that the Vickers hardness Hf of ferrite and the Vickers hardness Hm of martensite are measured with a micro Vickers hardness tester in conformity to JIS Z 2244: 2009. Further, "HV 0.01" means "hardness symbol" of a case where the micro-Vickers hardness test is conducted with a test force set to 0.098 N (10 gf). Note that the measurement is conducted at ten spots, and an average value of the measurements is adopted.

The volume fraction of ferrite in the inside region is determined by the following method. First, a sample (having a size that is roughly sheet thickness of steel sheet×20 mm in a width direction×20 mm in a direction perpendicular to the sheet-thickness direction and the width direction) for microstructure observation is extracted from a W/4 position or a 3W/4 position of a sheet width W of the steel sheet (i.e., W/4 position in the width direction from any one of end portions of the steel sheet in the width direction). Subsequently, a cross section of the sample parallel to the width direction and the thickness direction is polished as an observation surface and etched with LePera etchant, and then a microstructure on the observation surface is observed under an optical microscope. Then, an area fraction of ferrite in the inside region is measured. Note that, as described above, the width direction of the steel sheet means a direction that corresponds to a front-back direction of an automobile when the exterior panel is attached to the automobile.

More specifically, 10 fields on the observation surface are observed at a magnification of ×500, inside regions in the resultant optical micrographs are specified, and the inside regions are subjected to image analysis with image analysis software "Photoshop CS5" from Adobe Inc., an average value of area fractions of ferrite is calculated by the same image analysis method as that for the outer-layer region, and the value is taken as the volume fraction of ferrite in the inside region.

The volume fraction of martensite in the inside region can be determined by the same method as that for the volume fraction of ferrite described above. Note that, in the present invention, the martensite includes tempered martensite as described above.

Grain diameters of ferrite in the inside region can be determined by the following method.

In the optical micrographs described above, inside regions are specified, and the inside regions are subjected to image analysis in the above manner with the image analysis software "Photoshop CS5" from Adobe Inc., to measure an area fraction of ferrite and the number of ferrite particles. From an area of the analyzed regions and the area fraction of ferrite, a total area of ferrite is calculated, and further, the total area of ferrite is divided by the number of ferrite particles, by which an average area per ferrite particle is calculated. From the average area, an equivalent circle diameter is calculated, and the resultant equivalent circle diameter is taken as the average grain diameter of ferrite.

The measurement of grain diameters of martensite in the inside region is conducted by the same method as that for the measurement of grain diameters of ferrite described above. Here, the grain diameters of martensite mean those that fall under grain diameters of untransformed austenite immediately before martensitic transformation.

The sheet thickness of the flat portion of the steel sheet is obtained by taking a sample for sheet-thickness measurement from the flat portion of the steel sheet, and measuring a sheet thickness of the sample with a micrometer.

Sheet Thickness

[Sheet Thickness of Flat Portion of Steel Sheet: 0.20 to 0.60 mm]

Although the sheet thickness of the flat portion of the steel sheet is not limited to a specific sheet thickness, the sheet thickness is preferably 0.20 to 0.60 mm. When the sheet thickness of the flat portion is 0.20 mm or more, a thickness of the exterior panel is sufficient, which makes it easy to ensure the dent resistance. At the same time, when the sheet thickness of the flat portion is 0.60 mm or less, a weight of the exterior panel can be reduced, which makes it easy to provide a light exterior panel. In addition, when the sheet thickness of the flat portion is within the range, it is easy to control $uEl_1/uEl_2$ within a specified range by applying an appropriate prestrain. The sheet thickness of the flat portion of the steel sheet is obtained by taking a sample for sheet-thickness measurement from the flat portion of the steel sheet, and measuring a sheet thickness of the sample with a micrometer.

Other Properties

[Arithmetic Mean Waviness: 0.50 μm or Less]

As described above, the exterior panel is required to have a good surface property. Therefore, in the present invention, an arithmetic mean waviness Wa is used as an index of the surface property. Specifically, the arithmetic mean waviness Wa of the flat portion of the steel sheet is preferably 0.50 μm or less. Note that the arithmetic mean waviness Wa can be measured in conformity to JIS B 0601:2013 (ISO 4287: 1997, Amd.1:2009).

[Tensile Strength of Steel Sheet: 300 to 650 MPa]

A tensile strength of the steel sheet is preferably 300 to 650 MPa. When the tensile strength of the steel sheet is 300 MPa or more, it is easy to achieve a reduction in thickness of the exterior panel while a strength of the exterior panel is kept. At the same time, when the tensile strength of the steel sheet is 650 MPa or less, it is easy to ensure workability of the steel sheet.

Steel Type

A steel type of the steel sheet according to the present embodiment is not limited to a specific steel type, and the steel sheet may be any steel sheet containing at least ferrite. Concrete examples of such a steel sheet can include (a) ferrite phase steel sheet and (b) dual phase steel sheet (DP steel sheet). Note that, in the present embodiment, the ferrite phase steel sheet refers to a steel sheet having a volume fraction of ferrite of 95% or more. In addition, in the present embodiment, the DP steel sheet refers to a steel sheet having a volume fraction of ferrite of 80% or more with the balance being a hard microstructure containing martensite.

The dual phase steel sheet contains ferrite as a soft microstructure and martensite as a hard microstructure and thus is high-strength and excellent in workability in panel formation. In a DP steel sheet, martensite and ferrite are distributed in a mosaic pattern, where hard portions that have undergone transformation strengthening and soft portions that have not undergone transformation strengthening coexist together. As the DP steel sheet is used, deformation caused by cold plastic working (press forming) occurs mainly at ferrite, which is a soft microstructure. For this reason, a DP steel sheet is preferably used.

Preferable chemical compositions of (a) ferrite phase steel sheet and (b) DP steel sheet are as follows.

(a) Ferrite Phase Steel Sheet

Its chemical composition consists of, in mass %:
C: 0.0015 to 0.040%,
Si: 0 to 0.20%,
Mn: 0.20 to 1.50%,
P: 0.010 to 0.100%,
S: 0.020% or less,
sol.Al: 0.20% or less,
N: 0.0150% or less,
B: 0 to 0.010%,
Mo: 0 to 0.50%,
Ti: 0 to 0.20%,
Nb: 0 to 0.20%,
Cr: 0.001 to 0.50%,
Ni: 0 to 0.20%, and
Cu: 0 to 0.10%
with a balance being Fe and impurities.

The term "impurities" herein means components that are mixed in the steel sheet in producing the steel sheet industrially due to various factors in the production process including raw materials such as ores and scraps, and that are not components intentionally added to the steel sheet according to the present embodiment.

(b) DP Steel Sheet

Its chemical composition consists of, in mass %:
C: 0.020 to 0.145%,
Si: 0.010 to 3.00%,
Mn: 0.45 to 2.25%,
P: 0.030% or less,
S: 0.020% or less,
sol.Al: 0.30% or less,
N: 0.0100% or less,
B: 0 to 0.0050%,
Mo: 0 to 0.80%,
Ti: 0 to 0.20%,
Nb: 0 to 0.10%, Cr: 0 to 0.70%, and Ni: 0 to 0.25% with a balance being Fe and impurities.

The term "impurities" herein means components that are mixed in the steel sheet in producing the steel sheet industrially due to various factors in the production process including raw materials such as ores and scraps and that are not components intentionally added to the steel sheet according to the present embodiment.

Plating Layer

The steel sheet according to the present embodiment may include a plating layer on its surface. Having the plating layer on its surface, the steel sheet improves its corrosion resistance, which is preferable. Plating applied to the steel sheet is not limited to a specific plating; however, examples of the plating include hot-dip galvanizing, hot-dip galvannealing, electro-galvanizing, Zn—Ni plating (zinc alloy electroplating), Sn plating, Al—Si plating, electro-galvannealing, hot-dip zinc-aluminum alloy plating, hot-dip zinc-aluminum-magnesium alloy plating, hot-dip zinc-aluminum-magnesium alloy-Si plated steel sheet, and zinc-deposited aluminum plating.

Coating Layer

On a surface of the steel sheet according to the present embodiment, a coating layer is formed. The coating layer is a location that is directly seen on the exterior panel. When the plating layer is formed, the coating layer is formed on the plating layer. In a case of an exterior panel for an automobile, a thickness of paint is about 100 μm. A coating layer on the exterior panel for an automobile includes an electrodeposition coating layer, an intermediate coating layer, a base coat layer, and a clear coat layer in order from closest to farthest to the steel sheet. A thickness of the electrodeposition coating layer is, for example, 15 to 20 μm. A thickness of the intermediate coating layer is, for example, 25 to 35 μm. A thickness of the base coat layer is 10 to 15 μm. A thickness of the clear coat layer is 30 to 40 μm.

Production Method

Next, a preferable method for producing the exterior panel according to the present embodiment will be described. Irrespective of its production method, the exterior panel according to the present embodiment provides an advantageous effect as long as the exterior panel has properties described above. However, the following method is preferable because it allows the production to be performed stably.

[Method for Producing Steel-Sheet Starting Material]

First, a method for producing a steel-sheet starting material to be a starting material of the exterior panel will be described about (a) ferrite phase steel sheet and (b) DP steel sheet.

(a) Ferrite Phase Steel Sheet

In a case where a ferrite phase steel sheet is used, the steel-sheet starting material for the exterior panel according to the present embodiment can be produced by a production method including the following steps (ia-i) to (ia-vi).

(ia-i) Heating step of heating a slab having the chemical composition described above to 1000° C. or more, (ia-ii) Hot-rolling step of subjecting the slab to hot rolling such that a finish rolling temperature is 950° C. or less to provide a hot-rolled steel sheet, (ia-iii) Stress application step of applying a stress to the hot-rolled steel sheet after the hot-rolling step such that $\sigma_s$, which is a residual stress in its surface, is 100 to 250 MPa in terms of its absolute value, (ia-iv) Cold rolling step of subjecting the hot-rolled steel sheet after the stress application step to cold rolling in which $R_{CR}$, which is an total rolling ratio, is 70 to 90% to provide a cold-rolled steel sheet, (ia-v) Annealing step of subjecting the cold-rolled steel sheet to annealing in which the cold-rolled steel sheet is heated from 300° C. to a holding temperature T1° C. satisfying Formula (IIIa) shown below such that an average heating rate is 1.5 to 10.0° C./s, and then the cold-rolled steel sheet is held at the holding temperature T1° C. for 30 to 150 seconds, and $$Ac_1+550-25\times\ln(\sigma_s)-4.5\times R_{CR} \leq T1 \leq Ac_1+550-25\times\ln(\sigma_s)-4\times R_{CR} \quad \text{(IIIa)}$$

Here, $Ac_1$ in Formula (IIIa) above is given by Formula (IV) shown below.

$$Ac_1=723-10.7\times Mn-16.9\times Ni+29.1\times Si+16.9\times Cr \quad \text{(IV)}$$

(ia-vi) Cooling step of cooling the cold-rolled steel sheet after the annealing step to a temperature range of 550 to 650° C. such that an average cooling rate is 1.0 to 10.0° C./s from the holding temperature T1° C. to 650° C., and then cooling the cold-rolled steel sheet to a temperature range of 200 to 490° C. such that an average cooling rate is 5 to 500° C./s.

(b) DP Steel Sheet

In a case where a DP steel sheet is used, the steel-sheet starting material for the exterior panel according to the present embodiment can be produced by a production method including the following steps (ib-i) to (ib-vi).

(ib-i) Heating step of heating a slab having the chemical composition described above to 1000° C. or more, (ib-ii) Hot-rolling step of subjecting the slab to hot rolling at 950° C. or less to provide a hot-rolled steel sheet, (ib-iii) Stress application step of applying a stress to the hot-rolled steel sheet after the hot-rolling step such that $\sigma_s$, which is a residual stress in its surface, is 150 to 450 MPa in terms of its absolute value, (ib-iv) Cold rolling step of subjecting the hot-rolled steel sheet after the stress application step to cold rolling in which $R_{CR}$, which is a total rolling ratio, is 70 to 90% to provide a cold-rolled steel sheet, (ib-v) Annealing step of subjecting the cold-rolled steel sheet to annealing in which the cold-rolled steel sheet is heated from 300° C. to a holding temperature T1° C. satisfying Formula (IIIb) shown below such that an average heating rate is 1.5 to 10.0° C./s, and then the cold-rolled steel sheet is held at the holding temperature T1° C. for 30 to 150 seconds, and $$1275-27\times\ln(\sigma_s)-4.5\times R_{CR} \leq T1 \leq 1275-25\times\ln(\sigma_s)-4\times R_{CR} \quad \text{(IIIb)}$$

(ib-vi) Cooling step of cooling the cold-rolled steel sheet after the annealing step to a temperature range of 550 to 650° C. such that an average cooling rate is 1.0 to 10.0° C./s from T1° C. to 650° C., and then cooling the cold-rolled steel sheet to a temperature range of 200 to 490° C. such that an average cooling rate is 5.0 to 500.0° C./s.

Note that, in the stress application step, the stress can be applied by grinding the hot-rolled steel sheet with an outer-layer grinding brush after hot rolling or pickling, for example, in both cases of (a) ferrite phase steel sheet and (b) DP steel sheet described above. At this time, a contact pressure of the grinding brush against a surface of the steel sheet is changed to perform control while a residual stress in the outer layer is measured on-line with a portable X-ray residual stress measuring apparatus so that the residual stress is within the range described above. By performing predetermined cold rolling, annealing, and cooling while the residual stress applied to the surface within the range described above, a steel sheet containing ferrite including a predetermined texture and a predetermined hard phase distribution is provided. In addition, a plating step of forming the plating layer on the surface may be included after the cooling step.

[Method for Producing Exterior Panel from Steel-Sheet Starting Material]

An example of a method for producing an exterior panel from the steel-sheet starting material that is completed through the annealing step (final annealing) will be described. The steel-sheet starting material may be either one of (a) ferrite phase steel sheet and (b) DP steel sheet.

A preferable method for producing an exterior panel from the steel-sheet starting material in the present embodiment includes a step of subjecting the steel-sheet starting material after the final annealing to cold plastic working and heat treatment.

The method includes
(ii-i) Blanking step,
(ii-ii) Cold plastic working step of subjecting the blanked steel sheet to the cold plastic working to form a steel member,
(ii-iii) Coating step of coating the steel member, and
(ii-iv) Heat treatment step of subjecting the steel member to heat treatment in which the steel member is held at a temperature T2 of 80 to 200° C. for 300 to 1800 seconds.

Note that the coating step shown in (ii-iii) may be omitted. Each step will be described in detail.

(ii-i) Blanking Step

The steel-sheet starting material is formed into a blank by a blanking in which the steel-sheet starting material is cut into a predetermined size.

(ii-ii) Cold Plastic Working Step

Next, the blank is subjected to cold plastic working to be formed into a steel member before baking finish. Specifically, as the cold plastic working, draw-forming is performed on the blank to form the steel member before baking finish. A shape of the steel member corresponds to a shape of the exterior panel.

By the draw-forming, a prestrain is applied to the whole of the blank, and the blank is formed into the steel member. Usually, the prestrain applied to the blank by the draw-forming is less than 3%. However, in the present invention, an amount of strain applied by the draw-forming needs to be set to 3 to 6%.

Figure 1:
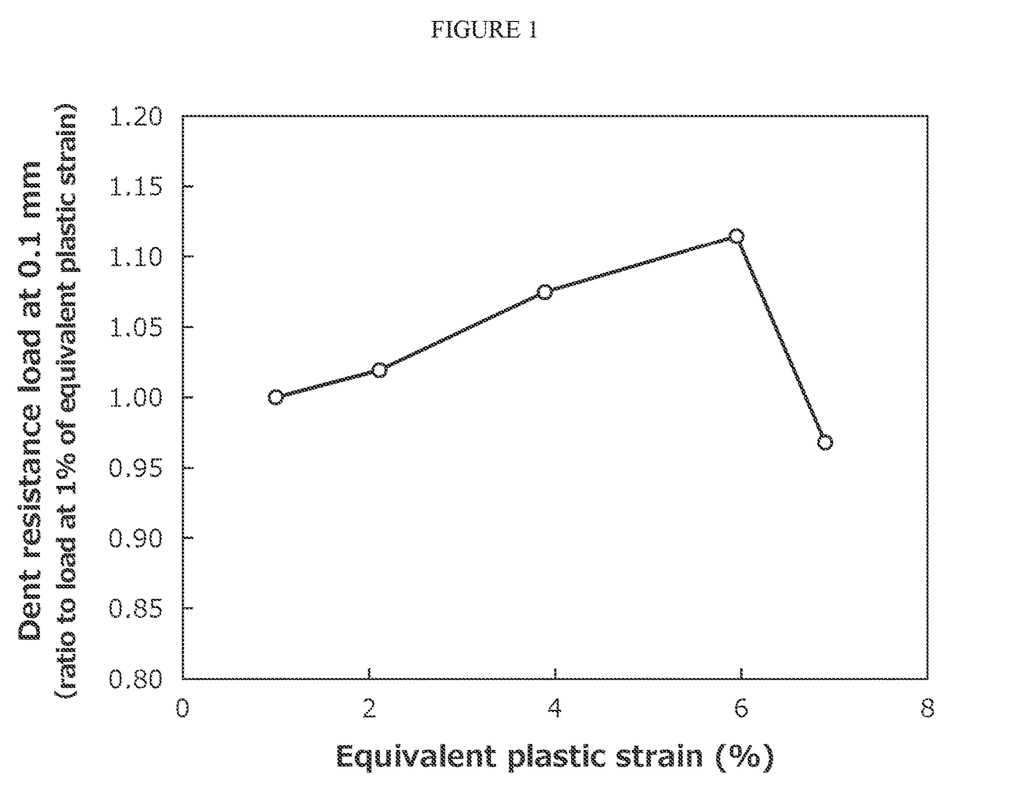
FIG. 1 is a graph illustrating an example of a relation between an equivalent plastic strain (%) applied by cold plastic working and a dent load when a dent having a depth of 0.1 mm is formed (dent resistance load).

FIG. 1 is a graph illustrating an example of a relation between an equivalent plastic strain (%) applied by the cold plastic working (draw-forming) and a dent load when a dent having a depth of 0.1 mm is formed (dent resistance load). In FIG. 1, its horizontal axis indicates the equivalent plastic strain. Its ordinate indicates a value obtained by dividing the dent resistance load (N) by a dent resistance load when the equivalent plastic strain is 1%. The graph illustrated in FIG. 1 illustrates, as an example, a result of the use of a 590 MPa-class dual phase steel sheet having a sheet thickness of 0.4 mm.

As is clear from the graph illustrated in FIG. 1, when the equivalent plastic strain is less than 3%, a rate of improvement in the dent resistance load is low. When the equivalent plastic strain is more than 6%, the dent resistance load is decreased with an increase in an amount of the plastic strain. Therefore, from the viewpoint of the dent resistance, the equivalent plastic strain is set to 3 to 6%. Further, by applying 3% or more of the prestrain, an amount of bake hardening can be increased sufficiently. The bake hardening is an effect of an increase in strength caused by interstitial elements (mainly carbon) moving and adhering to dislocations (line defects serving in an elementary process of plastic deformation) introduced in a steel sheet by the cold plastic working (prestrain), so as to hinder movement of the dislocations. The bake hardening is also called strain aging.

(ii-iii) Coating Step

Next, the steel member is subjected to coating. The coating includes, for example, three types of coating: electrodeposition coating, intermediate coating, and top coating (base and clear coating). For the coating, water-based paint or solvent paint is used. In an electrodeposition coating step, the entire surface of the steel member is subjected to electrodeposition coating with the steel member immersed in an electrodeposition bath filled with the paint. In an intermediate coating step, the entire surface of the steel member is subjected to the intermediate coating by spraying the paint from a spray nozzle to the steel member by a coating robot or by a worker manually. In a top coating step, the entire surface of the steel member is subjected to the top coating by spraying the paint from a spray nozzle to the steel member by a coating robot or by a worker manually. The surface of the steel member is thereby constituted by a coating layer having a thickness of about 100 μm.

(ii-iv) Heat Treatment Step

Heat treatment in the present process is baking and drying treatment for baking the coating layer onto the steel member and is a treatment of subjecting the steel member to the bake hardening. The heat treatment step may be performed in the coating step after the electrodeposition coating and before the intermediate coating, between the intermediate coating performed a plurality of times, after the intermediate coating and before the top coating, between the top coating performed a plurality of times, or after the top coating.

The temperature T2 of the steel member in the heat treatment step is set within the range of 80 to 200° C. as described above. With the temperature T2 in the heat treatment step being not less than a lower limit of the range, the paint can be baked onto the steel member reliably, and the steel member is more reliably subjected to the hardening. If the temperature T2 exceeds an upper limit of the range, costs of the production process of the exterior panel are increased. Therefore, the upper limit of the holding temperature is set to 200° C. or less.

A holding duration at the temperature T2 in the heat treatment is set within the range of 300 to 1800 seconds as described above. With the holding duration in the heat treatment step being not less than a lower limit of the range, the paint can be baked onto the steel member reliably, and the steel member is more reliably subjected to the hardening. If the holding duration is more than 1800 seconds, the costs of the production process of the exterior panel are increased. The holding duration is therefore set to 1800 seconds or less.

In the heat treatment step, the steel member is held at a constant temperature T2 within the temperature range consecutively for 300 to 1800 seconds. With the holding duration at the temperature T2 in the heat treatment step being not less than a lower limit of the range, an effect of baking the paint is provided. If the holding duration at the temperature T2 exceeds an upper limit of the range, the costs of the production process of the exterior panel are increased. The holding duration at the temperature T2 is therefore set to 1800 seconds or less.

Through the steps, the exterior panel in the present embodiment is completed.

In the present embodiment, by introducing a moderate strain into the steel sheet in the cold rolling step, an amount of work hardening can be increased, and thus the dent resistance load can be increased. This enables provision of an exterior panel that is excellent in surface property after the exterior panel is formed from its starting material and that is excellent in dent resistance.

EXAMPLE

Next, Examples of the present invention will be described. Conditions described in Examples are merely an example of conditions that was adopted for confirming feasibility and effects of the present invention, and the present invention is not limited to this example of conditions. In the present invention, various conditions can be adopted as long as the conditions allow the objective of the present invention to be achieved without departing from the gist of the present invention.

Steel A to C having chemical compositions shown in Table 1 are melted and subjected to continuous casting to be produced into slabs each having a thickness of 240 to 300 mm. The resultant slabs were heated to temperatures shown in Table 2. The heated slabs were subjected to hot rolling under conditions shown in Table 2 and coiled.

Thereafter, the coils were rewound, and a stress was applied to the resultant hot-rolled steel sheets. At this time, a contact pressure of a grinding brush against surfaces of the steel sheets was changed at working temperatures (steel sheet temperatures) shown in Table 2 while residual stresses in their outer layers were measured on-line with a portable X-ray residual stress measuring apparatus so that the residual stresses became residual stresses $\sigma_s$ shown in Table 2. Thereafter, the cold rolling was performed at total rolling ratios $R_{CR}$ shown in Table 2, by which steel sheets A1, A2, B1, and C1 were obtained.

Thereafter, the annealing and the cooling were performed under conditions shown in Table 3. In addition, some of the steel sheets were each plated to have a plating layer formed on its surface. In Table 3, CR indicates the plating was not performed, and GA indicates the hot-dip galvannealing was performed.

TABLE 1

| | Chemical composition (in mass %, balance: Fe and impurities) | | | | | | | | | | |
|---|---|---|---|---|---|---|---|---|---|---|---|
| Steel | C | Si | Mn | P | S | Al | N | Mo | Cr | Ti | Nb |
| A | 0.0025 | 0.012 | 0.84 | 0.024 | 0.010 | 0.05 | 0.0022 | 0.001 | 0.632 | 0.004 | 0.003 |
| B | 0.04 | 0.05 | 1.05 | 0.005 | 0.004 | 0.11 | 0.0022 | | 0.29 | 0.31 | |
| C | 0.07 | 0.45 | 1.85 | 0.015 | 0.005 | 0.03 | 0.0050 | | | 0.001 | |

TABLE 2

| | | Hot-rolling step | | | Stress application step | | Cold rolling step | |
|---|---|---|---|---|---|---|---|---|
| | | Heating step | Finish rolling | Coiling step | | | | |
| Steel sheet | Steel | Heating temperature (° C.) | Finish rolling start temperature (° C.) | Finish rolling temperature (° C.) | Coiling temperature (° C.) | Residual stress $\sigma_s$ (MPa) | Steel sheet temperature (° C.) | Total rolling ratio $R_{CR}$ (%) | Sheet thickness (mm) |
| A1 | A | 1100 | 850 | 885 | 700 | 107 | 30 | 90 | 0.594 |
| A2 | A | 1100 | 850 | 885 | 560 | 32* | 30 | 87 | 0.546 |
| B1 | B | 1200 | 950 | 890 | 700 | 248 | 110 | 34 | 0.581 |
| C1 | C | 1200 | 950 | 890 | 700 | 174 | 110 | 78 | 0.400 |

*indicates outside the preferred range of the present invention.

TABLE 3

| | Annealing step | | | Cooling step | | | |
|---|---|---|---|---|---|---|---|
| Steel sheet | Average heating rate (° C./s) | Holding temperature T1 (° C.) | Annealing time (s) | Average cooling rate of T1° C.~ 650° C. (° C./s) | Average cooling rate to cooling stopping temperature (° C./s) | Cooling stopping temperature (° C.) | Surface treatment Type of plating |
| A1 | 3.7 | 785 | 90 | 4.3 | 10 | 450 | GA |
| A2 | 5.4 | 650* | 120 | 5.7 | 11 | 350 | CR |
| B1 | 3.7 | 775 | 90 | 4.3 | 10 | 450 | GA |
| C1 | 8.3 | 800 | 40 | 9.2 | 92 | 350 | CR |

*indicates outside the preferred range of the preset invention

Figure 2:
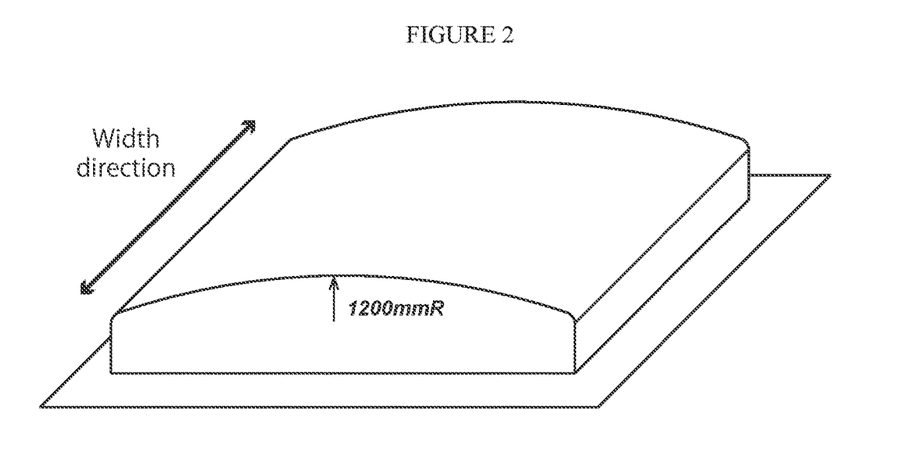
FIG. 2 is a diagram used for describing a shape of an exterior panel used in example.

Next, the steel sheets A1, A2, B1, and C1 were subjected to the cold plastic working to be formed to have a shape of the exterior panel. Specifically, a 600-mm square steel sheet is formed into a panel that had a shape illustrated in FIG. 2 and included a middle portion having a curvature radius R of 1200 mm. Note that a width direction illustrated in FIG. 2 is a direction corresponding to a front-back direction of an automobile when the exterior panel is attached to the automobile. In addition, methods for the cold plastic working at this time are shown in Table 4. Next, components each formed to have the shape of the exterior panel are subjected to the heat treatment (the bake hardening), by which components A1a to A1d, A2a, B1a, C1a to C1d, each of which was an exterior panel, were fabricated. Temperatures of the components and holding durations at the temperatures in the heat treatment are shown in Table 4.

The resultant components A1a to A1d, A2a, B1a, C1a to C1d were subjected to microstructure observation of their outer-layer regions and inside regions and measurement of their textures by the method described above. Results are shown in Table 5.

In addition, each of flat portions of the exterior panels was subjected to measurement of prestrain in the flat portion, uniform elongation $uEl_1$, theoretical uniform elongation $uEl_2$, ratio $uEl_1/uEl_2$, final yield stress (YS+WH+BH), tensile strength TS, and sheet thickness as shown in Table 6 by the method described above. Note that the final yield stress refers to a yield stress of the exterior panel after the heat treatment; the final yield stress is the sum of a yield stress YS of the steel sheet before the cold plastic working, an amount of strain hardening WH increased by the cold plastic working, and an amount of bake hardening BH increased by the heat treatment. The final yield stress was measured by conducting the tensile test described on the flat portion of the exterior panel. Steel types shown in Table 6 are F steel (ferrite phase steel sheet) and DP steel (dual phase steel sheet).

TABLE 4

| Component | Steel sheet | Cold plastic working step Method for forming | Heat treatment step (bake hardening) Temperature (° C.) | Time (s) |
|---|---|---|---|---|
| A1a | A1 | Draw-forming | 170 | 900 |
| A1b | A1 | Draw-forming | 170 | 900 |
| A1c | A1 | Form-forming* | 170 | 900 |
| A1d | A1 | Draw-forming | 170 | 900 |
| A2a | A2 | Form-forming* | 150 | 900 |
| B1a | B1 | Draw-forming | 170 | 900 |
| C1a | C1 | Draw-forming | 170 | 900 |
| C1b | C1 | Draw-forming | 170 | 1200 |
| C1c | C1 | Form-forming* | 170 | 1200 |
| C1d | C1 | Draw-forming | 170 | 1200 |

*indicates outside the preferred range of the present invention

TABLE 5

| | Outer-layer region | | | Inside region | | | | | | |
|---|---|---|---|---|---|---|---|---|---|---|
| Component | Volume fraction of ferrite (%) | Average grain diameter of ferrite (μm) | $X_{ODF}$ {001}/{111}, s, of ferrite | Volume fraction of ferrite (%) | Volume fraction of martensite (%) | Vickers hardness of ferrite (HV0.01) | Vickers hardness of martensite (HV0.01) | Average grain diameter of ferrite (μm) | Average grain diameter of martensite (μm) | |
| A1a | 99 | 8.1 | 0.66 | 99 | 0 | 107 | | 14.1 | | Inventive example |
| A1b | 98 | 7.9 | 0.62 | 99 | 0 | 108 | | 13.9 | | Inventive example |
| A1c | 99 | 8.0 | 0.67 | 99 | 0 | 110 | | 14.0 | | Comparative example |
| A1d | 97 | 8.3 | 0.63 | 99 | 0 | 108 | | 14.3 | | Comparative example |
| A2a | 99 | 8.1 | 3.80 | 99 | 0 | 110 | | 14.1 | | Comparative example |
| B1a | 94 | 10.1 | 0.80 | 94 | 6 | 108 | 392 | 16.1 | 9.6 | Inventive example |
| C1a | 87 | 13.3 | 1.52 | 86 | 11 | 153 | 403 | 19.3 | 12.3 | Inventive example |
| C1b | 86 | 13.8 | 1.55 | 86 | 13 | 152 | 408 | 19.8 | 12.1 | Inventive example |
| C1c | 86 | 13.6 | 1.57 | 86 | 13 | 152 | 397 | 19.6 | 12.1 | Comparative example |
| C1d | 86 | 13.6 | 1.55 | 86 | 13 | 149 | 404 | 19.6 | 8.1 | Comparative example |

Underline indicates outside the claimed range of the present invention

TABLE 6

| Component | Prestrain in flat portion (%) | Uniform elongation (%) | Theoretical uniform elongation (%) | uEl₁/ uEl₂ | Final yield stress YS + WH + BH (MPa) | Tensile strength TS (MPa) | Sheet thickness of flat portion (mm) | Steel type | |
|---|---|---|---|---|---|---|---|---|---|
| A1a | 6 | 11.7 | 20.7 | 0.57 | 366 | 359 | 0.558 | F | Inventive example |
| A1b | 3 | 15.8 | 20.7 | 0.76 | 339 | 359 | 0.576 | F | Inventive example |
| A1c | 2* | 17.1 | 20.6 | 0.83 | 322 | 359 | 0.582 | F | Comparative example |
| A1d | 7* | 8.9 | 20.7 | 0.43 | 358 | 359 | 0.552 | F | Comparative example |
| A2a | 2* | 17.0 | 20.6 | 0.83 | 320 | 359 | 0.535 | F | Comparative example |
| B1a | 4 | 13.4 | 19.7 | 0.68 | 430 | 442 | 0.558 | DP | Inventive example |
| C1a | 6 | 8.0 | 16.9 | 0.47 | 724 | 576 | 0.376 | DP | Inventive example |
| C1b | 3 | 11.7 | 16.6 | 0.70 | 675 | 594 | 0.388 | DP | Inventive example |
| C1c | 2* | 13.4 | 16.5 | 0.81 | 633 | 601 | 6.392 | DP | Comparative example |
| C1d | 7* | 3.7 | 16.7 | 0.22 | 700 | 601 | 0.372 | DP | Comparative example |

Underline indicates outside the claimed range of the present invention
*indicates outside the preferred range of the present invention.

[Dent Resistance Evaluation]

The produced exterior panels were subjected to evaluation of the dent resistance. Specifically, the dent resistance is influenced by a yield stress and a sheet thickness of a steel sheet. Therefore, final yield stress (YS+WH+BH)×(sheet thickness of the panel)$^{1.7}$ of a flat portion each produced exterior panel at its middle was calculated as a dent resistance index. The dent resistance index was calculated on a flat portion of a reference item at its middle. With the component A1b used as the reference item, (dent resistance index of exterior panel/dent resistance index of reference item) was calculated as a ratio index. Cases where the ratio index was 1.00 or more were rated as good in the dent resistance.

[Surface Property Evaluation]

The produced exterior panels were subjected to evaluation of the surface property. Specifically, on a 3-mm square region of the flat portion of each exterior panel, the arithmetic mean waviness Wa was measured. The arithmetic mean waviness was measured in conformity to the standard described above. Then, cases where the arithmetic mean waviness Wa was 0.50 μm or less was rated as good in the surface property after the formation.

[Overall Evaluation]

A product that was good in the dent resistance evaluation and good in the surface property evaluation was rated as Evaluation A, and a product that was not good in any of the dent resistance evaluation and the surface property evaluation was rated as Evaluation B. Results of these evaluations are shown in Table 7.

TABLE 7

| Component | Dent resistance evaluation | Surface property evaluation Wa (μm) | Overall evaluation | |
|---|---|---|---|---|
| A1a | 1.02 | 0.49 | A | Inventive example |
| A1b | 1.00 | 0.35 | A | Inventive example |
| A1c | 0.97 | 0.30 | B | Comparative example |
| A1d | 0.98 | 0.52 | B | Comparative example |
| A2a | 0.83 | 0.70 | B | Comparative example |
| B1a | 1.20 | 0.44 | A | Inventive example |
| C1a | 1.03 | 0.49 | A | Inventive example |
| C1b | 1.02 | 0.35 | A | Inventive example |
| C1c | 0.97 | 0.30 | B | Comparative example |
| C1d | 0.98 | 0.53 | B | Comparative example |

As shown in Tables 5 to 7, inventive examples of the present invention, in which microstructures of their outer-layer regions, $X_{ODF\{001\}/\{111\},S}$, and uEl₁/uEl₂ were within the respective ranges according to the present invention, were rated as A in the overall evaluation; formation of unevenness on their surfaces after the working was restrained, and they were excellent in the dent resistance. In contrast, comparative examples, in which one or more of the microstructures of their outer-layer regions, $X_{ODF\{001\}/\{111\}}$, s, and uEl₁/uEl₂ were out of the respective ranges according to the present invention, developed a pattern, were in a state of not being suitable as an exterior panel due to occurrence of unevenness, or were poor in the dent resistance, after the formation.

Specifically, as to the component A1c, the strain in its flat portion was as low as 2%, and its uEl₁/uEl₂ was out of its range according to the present invention. The component A1c was poor in dent resistance. As to the component A1d, the strain in its flat portion was as high as 7%, and its uEl₁/uEl₂ was out of its range according to the present invention. The component A1d was poor in dent resistance and the surface property. As to the component A2a, its $X_{ODF\{001\}/\{111\},S}$ and its uEl₁/uEl₂ were out of their ranges according to the present invention, and the strain in its flat portion was as low as 2%. The component A2a was poor in dent resistance and the surface property.

As to the component C1c, the strain in its flat portion was as low as 2%, and its uEl₁/uEl₂ was out of its range according to the present invention. The component C1c was poor in dent resistance. As to the component C1d, the strain in its flat portion was as high as 7%, and its uEl₁/uEl₂ was out of its range according to the present invention. The component C1d was poor in dent resistance and the surface property.

INDUSTRIAL APPLICABILITY

According to the present invention, an exterior panel that is excellent in surface property after the exterior panel is formed from its starting material and that is excellent in dent resistance. The present invention is therefore widely applicable to an exterior panel and an automobile including the exterior panel.

The invention claimed is:
1. An exterior panel including a steel sheet, the steel sheet including a flat portion, wherein
in an outer-layer region of the flat portion,
a microstructure contains, in volume fraction, ferrite of 80% or more,
an average grain diameter of ferrite is 1.0 to 15.0 μm, an intensity ratio $X_{ODF\{001\}/\{111\},S}$ between {001} orientation and {111} orientation of ferrite is 0.30 or more to less than 3.50, and when $uEl_1$ denotes a uniform elongation measured with a tensile test specimen cut from the flat portion, and $uEl_2$ denotes a theoretical uniform elongation that is derived by Formula (I) shown below from volume fractions, hardnesses, and average grain diameters of ferrite and martensite in a microstructure of an inside region of the flat portion, and a sheet thickness of the flat portion, $uEl_1/uEl_2$ is 0.44 to 0.80:

$$uEl_2 = -0.057 Hf \times Vf/100 - 0.055 Hm \times Vm/100 - 0.35 d^{-1/2} - 0.571 h + 27.2 \quad (I)$$

where the meaning of each symbol in Formula (I) above is as follows:

Hf: Vickers hardness (HV 0.01) of ferrite in the inside region

Hm: Vickers hardness (HV 0.01) of martensite in the inside region

Vf: Volume fraction (%) of ferrite in the inside region

Vm: Volume fraction (%) of martensite in the inside region d: Average grain diameter (μm) in the inside region calculated from Formula (II) shown below $$d = (df \times Vf + dm \times Vm)/(Vf + Vm) \quad (II)$$

df: Average grain diameter (μm) of ferrite in the inside region dm: Average grain diameter (μm) of martensite in the inside region h: Sheet thickness (mm) of the flat portion.

2. The exterior panel according to claim 1, wherein a sheet thickness of the flat portion is 0.20 to 0.60 mm.

3. The exterior panel according to claim 1, wherein a tensile strength of the steel sheet is 300 to 650 MPa.

4. An automobile comprising the exterior panel according to claim 1.

5. The exterior panel according to claim 2 wherein a tensile strength of the steel sheet is 300 to 650 MPa.

6. An automobile comprising the exterior panel according to claim 2.

7. An automobile comprising the exterior panel according to claim 3.

8. An automobile comprising the exterior panel according to claim 5.

* * * * *

UNITED STATES PATENT AND TRADEMARK OFFICE
CERTIFICATE OF CORRECTION

PATENT NO. : 11,975,765 B2
APPLICATION NO. : 18/013149
DATED : May 7, 2024
INVENTOR(S) : Yasunori Sawa et al.

It is certified that error appears in the above-identified patent and that said Letters Patent is hereby corrected as shown below:

In the Specification

Column 2; Lines 33-34:
Change:
"$u\text{El}_2 = -0.057\text{Hf} \times \text{Vf}/100 - 0.055\text{Hm} \times \text{Vm}/100 - 0.35\text{d}^{-1/}{}_2 - 0.571\text{h} + 27.2$"
To:
--$u\text{El}_2 = -0.057\text{Hf} \times \text{Vf}/100 - 0.055\text{Hm} \times \text{Vm}/100 - 0.35\text{d}^{-1/2} - 0.571\text{h} + 27.2$--

In the Claims

Column 21; Lines 14-15; Claim 1:
Change:
"$u\text{El}_2 = -0.057\text{Hf} \times \text{Vf}/100 - 0.055\text{Hm} \times \text{Vm}/100 - 0.35\text{d}^{-1/}{}_2 - 0.571\text{h} + 27.2$ (I)"
To:
--$u\text{El}_2 = -0.057\text{Hf} \times \text{Vf}/100 - 0.055\text{Hm} \times \text{Vm}/100 - 0.35\text{d}^{-1/2} - 0.571\text{h} + 27.2$ (I)--

Signed and Sealed this
Sixth Day of August, 2024

Katherine Kelly Vidal
*Director of the United States Patent and Trademark Office*